Dec. 23, 1947.  P. S. DENNING  2,433,265

MANUFACTURE OF MAGNESIA PRODUCTS

Filed June 14, 1944

```
┌─────────────────────────────────────────┐
│   PREPARATION OF MAGNESIA CEMENT        │
│     E.G. MAGNESIUM OXYCHLORIDE          │
│   CEMENT TO MOLDING CONSISTENCY         │
└─────────────────────────────────────────┘
                    │
┌─────────────────────────────────────────┐
│        PLACING CHARGE OF CEMENT         │
│         IN MOLD EQUIPPED WITH           │
│              HEATING MEANS              │
└─────────────────────────────────────────┘
                    │
┌─────────────────────────────────────────┐
│  SIMULTANEOUS APPLICATION OF HEAT AND   │
│     PRESSURE TO MATERIAL IN MOLD        │
│       PRESSURES - 1000 - 3000 P.S.I.    │
│    MOLD TEMPERATURES - 120°F - 360°F    │
└─────────────────────────────────────────┘
                    │
┌─────────────────────────────────────────┐
│    APPLICATION OF HEAT AND PRESSURE     │
│   FOR SHORT PERIOD - E.G. 15-30 SECS.   │
│                  THEN                   │
│            DISCHARGE FROM MOLD          │
└─────────────────────────────────────────┘
```

INVENTOR
PAUL S. DENNING
BY Roland C Lehm
ATTORNEY

Patented Dec. 23, 1947

2,433,265

UNITED STATES PATENT OFFICE 2,433,265

MANUFACTURE OF MAGNESIA PRODUCTS

Paul S. Denning, Joliet, Ill., assignor to F. E. Schundler & Co., Inc., Joliet, Ill., a corporation of Illinois Application June 14, 1944, Serial No. 540,315

6 Claims. (Cl. 18—47.5)

This invention relates to the manufacture of magnesia products and among other objects, aims to provide an improved method for making a product of this character having new and improved properties.

The nature of the invention may be readily understood by reference to one illustrative product and its manufacture.

The drawing is a flow sheet or diagram of an illustrative method.

Products made from reacting caustic magnesia (magnesium oxide) with solutions such as magnesium chloride and magnesium sulphate are well known. For example, caustic magnesia and magnesium chloride solution react to form the well-known magnesium oxychloride cement which, with various inert fillers, or aggregates, has been widely used for many years. It has always been a fundamental principle in forming magnesium oxychloride cement that temperatures during reaction must be held down (i. e., below 120° F.), otherwise, the product would become weak, soft and cheese-like. This is true even though the material initially takes a hard set; in the course of two or three days it will degenerate to a soft or cheese-like condition.

I have discovered unexpectedly, and contrary to all teachings on the subject, that if a mixture of caustic magnesia and magnesium chloride solution, generally with a conventional filler, be heated and simultaneously molded or otherwise formed under high pressure (of the order of 1000 to 3000 lbs. per sq. in.) it sets up very quickly to form an entirely new and unexpected product, having none of the objectionable properties above mentioned. This new product is strong, permanently hard and bonelike, and has a remarkable resistance to water. This resistance is not due alone to a denser surface (which would, of course, retard water penetration), but apparently to a different reaction product having properties not heretofore known. The surface itself is more highly resistant to water.

The setting time of the cement under these pressures and temperature substantially in excess of 120° F. is practically instantaneous. Due to the short reaction time and inclosure by the heated mold, the material itself develops substantial heat which is useful in the process. One manner of applying heat is to heat the mold itself which, being metal, conducts heat readily to the material in the mold.

One illustrative material comprises caustic magnesia and a substantial volume of a filler such as wood flour mixed with magnesium chloride solution to a moist earth consistency, that is, to such consistency that it will retain its shape when compressed in the hand. If the mixture be too soft (because of the addition of too much magnesium chloride solution) it will become so plastic that high pressures cannot be developed in the mold. The concentration of the magnesium chloride solution is generally within the same limits as in ordinary magnesium oxychloride cements. A suitable concentration is 28° Beaumé. The amount of filler used may be varied widely, depending on the function or use of the molded object. Less filler is used for very hard products. A surprisingly hard product may be made even when the ratio of filler to magnesia by volume is four to one. For thin molded products an additional fibrous filler, such as cotton linters, may be used. While silica and other hard fillers have been customarily used in magnesium oxychloride cement, their abrasive action makes them less desirable in metal molds than softer fillers, such as wood flour or wood fibre, etc.

Prior to introduction into the mold the latter is preferably heated substantially above 120° F. (the temperature which ordinarily is critical for magnesium oxychloride cements). The mold temperature may advantageously be of the order of 215 to 360 deg. F. This heat, plus that developed by reaction of the product itself under pressure in the mold, furnishes sufficient heat for completing the process. The pressures used in the mold are of the order of 1000 to 3000 lbs. per sq. in. The setting of the cement is practically instantaneous, i. e., 15 to 30 seconds. The temperature of magnesium oxychloride cement products should not be substantially in excess of 310° F. at least for any appreciable time, since decomposition of the cement starts around this temperature.

It is my present theory that the reaction at high pressures and at temperatures substantially above 120° F. results in a different product or molecule. If the material be compressed alone (but at low temperatures) and held under pressure until completely set, the material should be physically as dense as that made with my process, but the actual differences in physical characteristics between the two materials is so great as to suggest that the reaction occurring in my process produces an entirely different composition, having different physical properties.

My process may also advantageously be used in forming or molding magnesium oxysulphate cement products. The simultaneous application of heat and high pressure also produces unexpectedly a product having a hard, dense surface unlike anything heretofore produced with magnesium oxysulphate cement. In such products as in the conventional magnesium oxysulphate cement products, a small amount of a citrate or citric acid (e. g., one-half of one per cent on the weight of magnesia) should be used to improve water ressitance. The proportion of filler and concentration of the magnesium sulphate solution may vary as in magnesium oxysulphate cement products. A suitable concentration for the magnesium sulphate solution is 29° Beaumé.

Ordinary magnesium oxysulphate cement is relatively slow setting, yet at these high temperatures and pressures, the reaction is substantially instantaneous, as with magnesium oxychloride cement; and the resulting product has new and unexpected properties substantially different from those resulting from application of heat or pressure alone.

These novel properties and their rapid formation now make magnesium oxychloride and magnesium oxysulphate cements available as substitutes for so-called plastics. Heretofore these cements have been considered no more analogous to or as substitutes for these plastics than Portland cement, for example. And their cost is very much less than that of plastics.

The drawing diagrammatically illustrates one method as applied to magnesium oxychloride cement. Various types of presses may be used. A press of the type used for molding thermo-setting plastics may advantageously be used provided it have sufficient power to apply the pressures desired.

Obviously, the invention is not limited to the details of the illustrative product or process since these may be variously modified. Moreover, it is not indispensable that all features of the invention be used conjointly, since various features may be used to advantage in different combinations and sub-combinations.

Having described my invention, I claim:

1. The method of forming molded magnesia cement products of great strength which comprises placing a plastic magnesium oxychloride cement preparation into a mold, simultaneously heating the mold to temperatures of the order of 120° F. to 360° F. and applying pressures to the material in the mold of the order of 1000 to 3000 lbs. per square inch to cause the cement to set up very quickly with a strength substantially greater than that possessed by the same cement if subjected only to said temperatures, and discontinuing the simultaneous application of heat and pressure after a very short period of the order of 15 to 30 seconds.

2. The method of utilizing a magnesia cement as a substitute for quick setting thermo-setting plastics which comprises introducing into a mold a plastic magnesium oxychloride cement preparation, retaining the cement in the mold for a short period of the order of 15 to 30 seconds, and while the cement is in the mold subjecting it to simultaneous heat and pressures, the heat being of the order of 120° F. to 360° F. and the pressures being of the order of 1000 to 3000 lbs. per square inch.

3. The method of utilizing a magnesia cement as a substitute for quick setting thermo-setting plastics which comprises preparing a plastic mixture comprising caustic magnesia and a magnesium salt solution of the class consisting of magnesium chloride and magnesium sulphate, introducing a charge of the cement into a mold and compressing it therein under pressures of 1000 to 3000 lbs. per square inch for about 15 to 30 seconds, and during the application of pressure heating the material in the mold to temperatures above 120° F. but not exceeding 360° F.

4. The method of utilizing a magnesia cement as a substitute for quick setting thermo-setting plastics which comprises preparing a plastic mixture comprising caustic magnesia and a magnesium salt solution of the class consisting of magnesium chloride and magnesium sulphate, introducing a charge of the cement into a mold and simultaneously heating and compressing the material in the mold so that it will set up with great strength in not substantially longer time than is required to set up a thermo-setting plastic, the heat applied being of the order of 120° F. to 360° F. and the pressures of the order of 1000 to 3000 lbs. per square inch.

5. The method of utilizing a magnesia cement as a substitute for quick setting thermo-setting plastics which comprises preparing a plastic mixture comprising caustic magnesia and a magnesium salt solution of the class consisting of magnesium chloride and magnesium sulphate, introducing a charge of the cement into a metal mold, heating the mold so as to heat the material therein to temperatures exceeding 120° F. but not exceeding 360° F., and simultaneously compressing the material in the mold to pressures of from 1000 to 3000 lbs. per square inch, thereby causing the material to set up with great strength in not substantially longer time than is required for setting a thermo-setting plastic.

6. The method of forming and setting up a magnesia cement product which comprises introducing a moist magnesium oxychloride cement composition into a mold heated to temperatures substantially above 120° F. but not exceeding 360° F., and simultaneously highly compressing the material in the mold for about 30 seconds.

PAUL S. DENNING.

REFERENCES CITED

The following references are of record in the file of this patent:

UNITED STATES PATENTS

| Number | Name | Date |
| --- | --- | --- |
| 1,964,088 | Snell | June 26, 1934 |
| 2,348,614 | Dinkfeld et al. | May 9, 1944 |
| 769,087 | Ibotson | Aug. 30, 1904 |
| 703,640 | Chappell | July 1, 1902 |
| 711,329 | Mielck | Oct. 14, 1902 |
| 897,939 | Tyc et al. | Sept. 8, 1908 |

OTHER REFERENCES

Plastic Magnesia Cements, The Dow Chemical Company, copyright 1927, page 119.